UNITED STATES PATENT OFFICE.

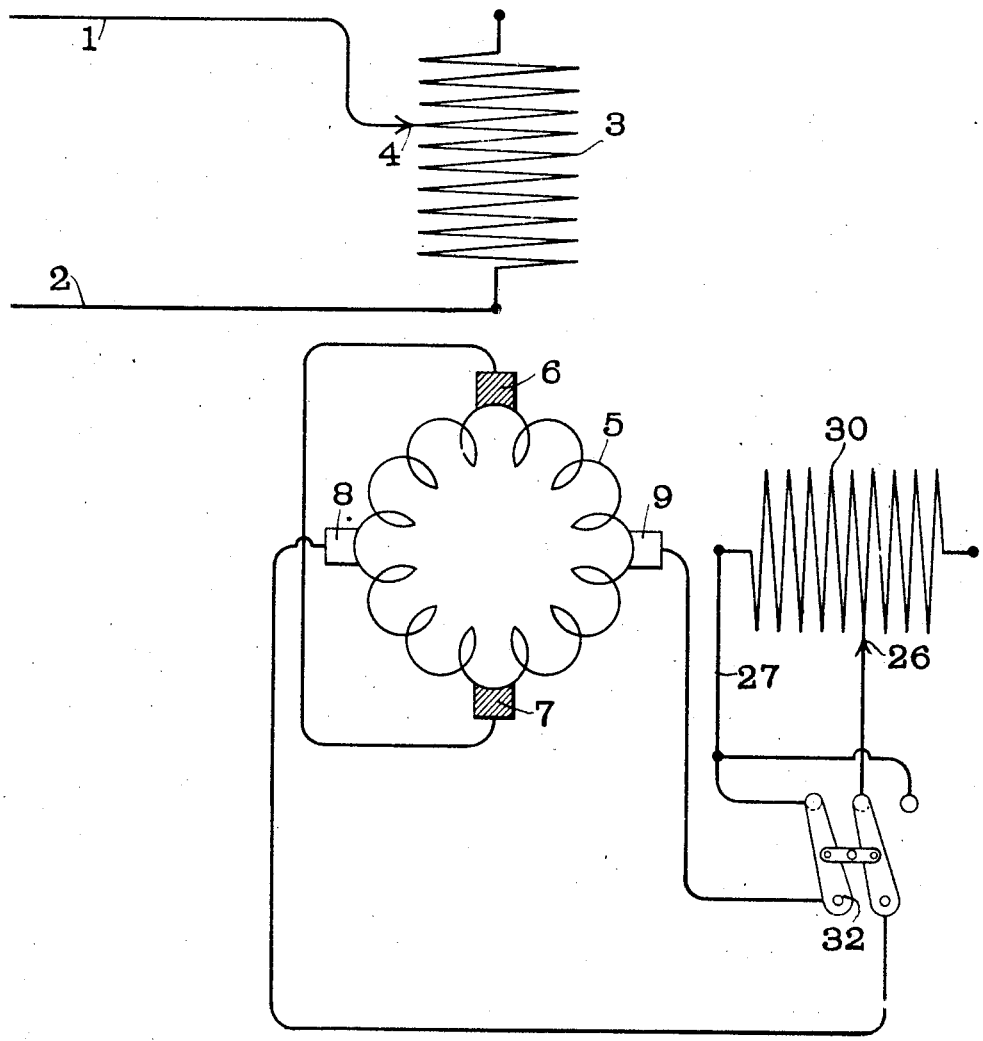

VALÈRE ALFRED FYNN, OF LONDON, ENGLAND.

ALTERNATING-CURRENT MOTOR.

956,894.      Specification of Letters Patent.      Patented May 3, 1910.

Original application filed December 19, 1906, Serial No. 348,659. Divided and this application filed March 6, 1909. Serial No. 481,765.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

This application is a division of my prior application, Serial No. 348,659, filed December 19, 1906.

My invention relates to alternating current commutator motors of the single-phase induction type, the induced and commuted winding of which is closed over brushes and along more than one axis per pole pair.

The objects of this invention are to make it possible to operate such motors from a single-phase supply at any desired constant speed quite independently of the periodicity of the supply and of the number of poles of the motor, to make it possible to rationally vary or adjust this speed and to improve their commutation.

According to this invention I adjust the speed of a self-excited alternate current motor of the said type to any desired and practically constant speed differing from the synchronous, or I vary its speed at will by disposing on the stator a field winding displaced from the main inducing winding, by including said stator field winding in the exciting circuit, *i. e.* by connecting it in series relation with the field winding disposed on the rotor and by suitably selecting the number of turns and the direction of the magnetization of the stator field winding relatively to the direction of the magnetization due to the rotor field winding.

In order to improve the commutation of this machine I provide means for adjusting the magnitude of the transformer field which is due to the main stator inducing winding, for instance by varying the volts per turn of said winding. The variation of the magnitude of the transformer field will only influence the power but not the speed of the motor unless a constant E. M. F. in phase quadrature with that impressed on the main stator winding is included in the exciting circuit. I can improve the power factor of this machine in the manner already disclosed by me in my United States Patent No. 777,198, *i. e.* by including in the working circuit of the rotor an E. M. F. approximately in phase quadrature with that impressed on the main stator winding or by including in the exciting circuit of the rotor an E. M. F. approximately in phase with the E. M. F. impressed on the main stator winding.

Referring to the accompanying drawings, which diagrammatically illustrate a two-pole motor made in accordance with my invention, 1, 2 are the mains and they are connected to the main stator inducing winding 3, the volts per turn of 3 can be regulated as shown at 4, thus regulating the magnitude of the transformer flux. The induced member is provided with a commuted winding 5 and is short-circuited along the axis of 3 by way of the working brushes 6, 7. The stator also carries a field winding 30 connected in series with the rotor by way of the exciting brushes 8, 9 and the reversing switch 32 along an axis displaced from that of 3 preferably by 180/n degrees; where the letter "n" stands for the number of poles of the motor. The stator field winding is preferably displaced from 3 by 180/n degrees and the number of its turns can be varied at 26, whereas the direction of the magnetization it produces can be altered relatively to the magnetization due to the rotor field winding, that comprised between the exciting brushes 8 and 9, by means of 32.

Having fully described my invention what I claim as new and desire to secure by Letters Patent of the United States, is:

1. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, and means for varying the magnitude of the flux produced by said field winding.

2. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, and means for varying the direction of the flux produced by said field winding.

3. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, and a movable contact for varying the effective turns of said field winding.

4. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, and means for varying the volts per turn in the main inducing winding.

5. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, means for varying the direction of the flux produced by said field winding, and means for varying the volts per turn in the main inducing winding.

6. In an alternating current motor, the combination with an induced member, of an inducing member provided with a main inducing winding and a field winding displaced from said main inducing winding, means for short-circuiting the induced member coaxially with the main inducing winding, means for forming a local circuit including only said field winding and the induced member along an axis displaced from that of the inducing winding, means for varying the volts per turn in the main inducing winding, and means for varying the magnitude of the flux produced by said field winding.

In witness whereof I have hereunto set my hand and affixed my seal in the presence of the two subscribing witnesses.

VALÈRE ALFRED FYNN. [L. S.]

Witnesses:
W. A. ALEXANDER,
E. E. HUFFMAN.